June 14, 1938. E. KÄGI 2,120,864
GAS-AIR MIXING VALVE FOR BURNERS
Filed March 17, 1936
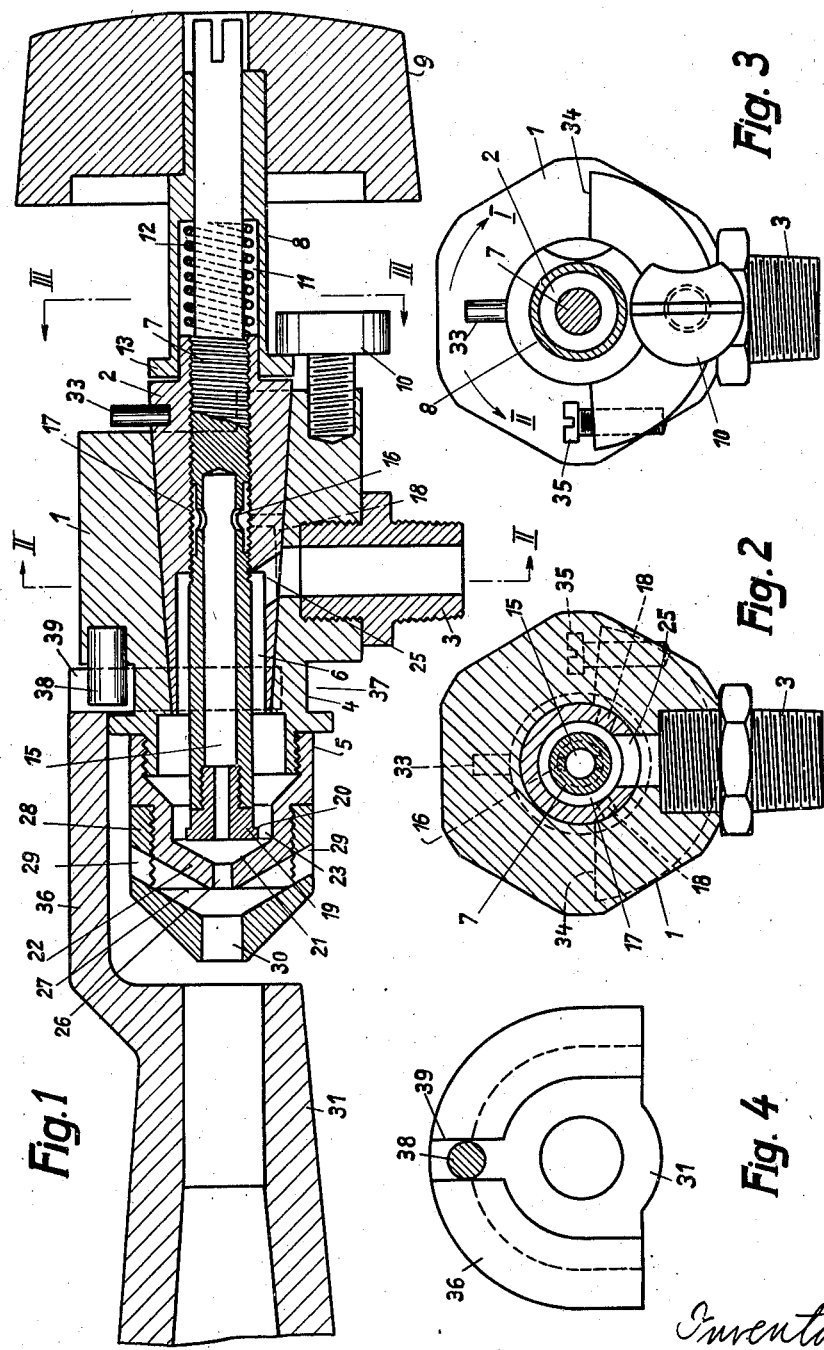

Patented June 14, 1938

2,120,864

UNITED STATES PATENT OFFICE 2,120,864

GAS-AIR MIXING VALVE FOR BURNERS

Emil Kägi, Bahnweg, Wadenswil, Canton Zurich, Switzerland

Application March 17, 1936, Serial No. 69,402
In Switzerland August 7, 1935

7 Claims. (Cl. 158—118)

This invention relates to gas-air mixing valves for burners of the kind in which an axially displaceable spindle controls the passage of gas from an inner nozzle to an outer nozzle having inlets through which air is drawn and in which valve the gas and air are mixed before emerging from the outer nozzle.

This improved valve is designed more particularly for use with gas cooking stoves and is employed at the end of the usual pipe leading to the burner and with or without additional air supply.

According to the invention the present valve is characterized in that the spindle thereof has a hollow leading to a point adjacent to the outlet orifice of the inner nozzle and is adjustably mounted axially of a plug which can be turned to open the main gas passage to enable the gas to flow to the inner nozzle externally of the hollow spindle and can be turned to put the said hollow into communication with the gas inflow passage to the valve whereby the gas flows through the said hollow and thence to the inner nozzle.

In the accompanying drawing is shown an example of construction wherein:

Fig. 1 shows an axial section of a mixing valve,

Figs. 2 and 3 are sections on the lines II—II and III—III of Fig. 1.

Fig. 4 is an end elevation of the part of the burner shown in Fig. 1 looking from right to left in said figure, a portion of the pin or lug 38 being shown in section.

The mixing valve is provided with a casing 1 in which is mounted rotatably the valve body 2. The casing 1 is provided with a tubular member or nipple 3 for connection to a gas supply pipe and a tubular member 4 on to which the adjusting nozzle 5 is mounted detachably. The body 2 is provided with an axial bore 6. Into the body 2 is screwed a screw spindle 7 passing through the bore 6. The spindle passes through the hollow stem 8 of the hand-piece 9 which is connected detachably to the body 2 by means of a screw 10. In the bore 11 of the stem 8 is located a spring 12; this tends to press the flange 13 of the stem 8 against the head of the screw 10. The spindle 7 serves for regulating the gas supply. For this purpose the spindle 7 is provided with an axial bore 15. This communicates by means of a transverse bore 16 with an annular space 17 which in turn can be connected by means of the passages 18 when the body 2 is turned. At the front end of the spindle 7 there is mounted exchangeably a mouth-piece 19 provided with an annular flange 20. This annular flange 20 may be adjusted more or less closely to the inner wall 21 of a nozzle 22 by turning the spindle. There is thus formed an annular space 23 of adjustable width. Through this space 23 gas, supplied through the tubular member and which enters the bore 6 through the radial bore 25 of the body, can flow to the outflow bore 26 of the nozzle 22. The gas flows into an annular space 27, located between the nozzle 22 and a further nozzle 28, which latter is seated adjustably on the nozzle 22. The nozzle 28 is provided with radial bores 29 through which air can enter the space 27. The gas-air mixture passes through the bore 30 into the burner pipe 31 of the burner and flows from here to the burner proper (not shown). By the construction described of the parts of the spindle 7 and of the nozzles 19, 22, there is obtained a very efficient mixing and a very steady through flow of the gas-air mixture, even when the flame is very low and only a small quantity of gas passes through.

In the position of the body 2 according to Figs. 1-3 the bore 25 is exposed completely. When the body 2 is turned in the direction of the arrow I (Fig. 3) until the pin 33 meets the stop surface 34 the gas supply pipe is closed completely. Before, however, the closing takes place one of the passages 18 comes to lie opposite the gas supply pipe 3 and some gas flows through the passage 18 into the bore 15 and flows through the nozzle 19. The closing of the gas supply pipe to the burner is also effected with a certain amount of delay when turning the body quickly. Also when opening the valve the gas first flows through the passage 18 and only subsequently through the bore 25 to the burner 31.

When the body is turned in the direction of the arrow II the pin 33 bears against the head of a set screw 35. According to the adjustment of the screw 35 the passage 18 is left more or less open so that more or less gas flows through and the flame can be kept of corresponding size.

The spindle 7 and thus the gas supply to the mixing chamber can be adjusted easily without disassembling the valve.

The mixing valve is fitted in the known manner into the burner pipe. The two parts, the burner pipe and the mixing chamber always retain their position in which a correct air-gas mixture can be obtained. An inwardly projecting flange 36 of the burner 31 engages an annular ring space 37 of the casing 1 and secures thereby the parts 1 and 31 in their respective axial position. A pin or stud 38 entering the radially disposed slit 39 of the burner 31 prevents the parts 1, 31 from rotating.

What I wish to secure by U. S. Letters Patent is:—

1. A gas-air mixing valve for a burner, comprising a casing having a plug-receiving bore and a gas inlet duct leading to said bore, a plug-valve in said plug-receiving bore, said plug-valve having an axial bore and a gas port for effecting communication between said gas inlet duct and said axial bore when the plug-valve is in one position, a regulating spindle threaded in said plug-valve's axial bore, said spindle having a hollow portion with a discharge port, a nozzle carried by said casing into which nozzle the spindle projects, said plug-valve and said spindle having passages positioned with respect to one another and to said gas inlet duct so that when said plug-valve is in another position gas will flow from said gas inlet through said hollow spindle to said nozzle via said passages and the flow of gas to said nozzle from said gas inlet port directly via the axial bore of said valve will be shut off in whole or in part, and means whereby said plug-valve can be turned.

2. In a gas-air mixing valve for a burner, a casing having a plug-receiving bore and a gas inlet port entering said bore, a plug-valve in said bore, a regulating spindle passing through said plug-valve, said plug-valve having a space at one end surrounding a portion of said regulating spindle, said casing having a chamber with which said space communicates, a nozzle on said casing as a cap for said chamber, said spindle having a hollow portion and a mouth-piece to discharge into said nozzle, said spindle having means to adjust the distance of said mouth-piece from said nozzle, said spindle and said plug-valve having passages so located that in one position of the plug-valve gas will flow from said inlet port via said space around said mouth-piece to said nozzle, and when said plug-valve is turned to another position gas will flow from said inlet port via said passages through the hollow of said spindle and through said mouth-piece to said nozzle; and when said plug-valve is in a third position said inlet port will be entirely closed.

3. In a gas-air mixing valve for a burner, a nozzle, an axially adjustable hollow spindle for controlling passage of gas from said nozzle, a casing carrying said nozzle and said spindle and having a gas inlet port, a rotatable plug-valve in which said spindle is mounted, said plug-valve, said spindle and said casing including means for enabling a major flow of gas to pass from said inlet port around said spindle to said nozzle or a flow of gas to pass from said inlet port through the hollow of said spindle to said nozzle, accordingly as said plug-valve is in one position or another, and to shut off the flow of gas when said plug-valve is in a third position.

4. In a gas-air mixing valve for a burner, a nozzle, an axially adjustable hollow spindle for controlling passage of gas from said nozzle, a case carrying said nozzle and said spindle and having a gas inlet port, means including a rotatable plug-valve in which said spindle is mounted and having a port cooperating with a port in said spindle for enabling a major flow of gas to pass from said inlet port around said spindle to said nozzle or a flow of gas to pass from said inlet port through the hollow of said spindle to said nozzle, accordingly as said plug-valve is in one position or another, and to shut off the flow of gas when said plug-valve is in a third position, and a second nozzle having air inlet ports into which second nozzle the first nozzle delivers the gas and through which the gas-air mixture passes.

5. In a gas-air mixing valve for a burner, a nozzle, an axially adjustable hollow spindle for controlling passage of gas from said nozzle, a casing carrying said nozzle and said spindle and having a gas inlet port, a rotatable plug-valve in which said spindle is mounted, said plug-valve, said spindle and said casing, all containing cooperating passages for enabling a major flow of gas to pass from said inlet port around said spindle to said nozzle or a flow of gas to pass from said inlet port through the hollow of said spindle to said nozzle, accordingly as said plug-valve is in one position or another, and to shut off the flow of gas when said plug-valve is in a third position, said nozzle having a conical portion and said spindle having a mouth-piece cooperative with said conical portion as a valve.

6. In a gas-air mixing valve for a burner, a nozzle, an axially adjustable hollow spindle for controlling passage of gas from said nozzle, a casing carrying said nozzle and said spindle and having a gas inlet port, means including a rotatable plug-valve in which said spindle is mounted and having a port cooperating with a port in said spindle for enabling a major flow of gas to pass from said inlet port around said spindle to said nozzle or a flow of gas to pass from said inlet port through the hollow of said spindle to said nozzle, accordingly as said plug-valve is in one position or another, and to shut off the flow of gas when said plug-valve is in a third position, and a second nozzle having air inlet ports into which second nozzle the first nozzle delivers the gas and through which the gas-air mixture passes, said first nozzle having a conical portion and said spindle having a mouth-piece cooperative with said conical portion as a valve.

7. In a gas-air mixing valve for a burner, a nozzle, an axially adjustable hollow spindle for controlling passage of gas from said nozzle, a casing carrying said nozzle and said spindle and having a gas inlet port, means including a rotatable plug-valve in which said spindle is mounted and having a port cooperating with a port in said spindle for enabling a major flow of gas to pass from said inlet port around said spindle to said nozzle or a flow of gas to pass from said inlet port through the hollow of said spindle to said nozzle, accordingly as said plug-valve is in one position or another, and to shut off the flow of gas when said plug-valve is in a third position, and a second nozzle having air inlet ports into which second nozzle the first nozzle delivers gas and through which the gas-air mixture passes, said first nozzle having a conical portion and said spindle having a mouth-piece cooperative with said conical portion as a valve, the outlet orifices of said mouth-piece, said inner nozzle and said outer nozzle being of progressively increased diameters and being in axial alignment with each other.

EMIL KÄGI.